United States Patent [19]

Braukmann

[11] 4,090,962

[45] May 23, 1978

[54] REVERSE FLUSHING FILTER DEVICE

[75] Inventor: Bernhard W. Braukmann, Mosbach, Germany

[73] Assignee: Braukmann Armaturen A.G., Rothrist, Switzerland

[21] Appl. No.: 794,349

[22] Filed: May 6, 1977

[30] Foreign Application Priority Data

Oct. 12, 1976 Germany .............................. 2645948

[51] Int. Cl.² ............................................. B01D 29/38
[52] U.S. Cl. .................................. 210/108; 210/132; 210/138; 210/333 R
[58] Field of Search ............ 210/108, 132, 138, 333 R

[56] References Cited

U.S. PATENT DOCUMENTS

| | | | |
|---|---|---|---|
| 2,220,706 | 11/1940 | Cantin | 210/132 |
| 3,282,428 | 11/1966 | Rosaen | 210/132 |
| 3,994,810 | 11/1976 | Schaeffer | 210/333 R |
| 4,046,692 | 9/1977 | Braukmann et al. | 210/108 |

*Primary Examiner*—John Adee
*Attorney, Agent, or Firm*—William T. Howell

[57] ABSTRACT

A reverse flushing device has a housing with an inlet, an outlet and a first filter to receive the flow therebetween with means in the housing to divert flow through the first filter. A second filter, positioned upstream of the first filter, has an internal apertured housing with a movable apertured slide operable thereon to provide a closure to the second filter during flow through the first filter. The housing has a discharge aperture with a movable shut off element. The diverting means and tubular slide are responsive to opening of the shut off element whereby the former diverts flow through the first filter and the tubular slide aligns with the second filter housing to permit flow therethrough and into the tubular slide extension to reverse flush the particles on the first filter into the discharge aperture.

13 Claims, 7 Drawing Figures

REVERSE FLUSHING FILTER DEVICE

FIELD OF THE INVENTION

The invention relates to a reverse flushing filter device, especially for domestic water installations, the said device having a main filter between the inlet and the outlet and an outlet aperture for substances filtered out, the said aperture being adapted to be closed by means of a discharge shut off device.

Prior Art

Filter devices of this kind are already known per se and are used in domestic water installations for the purpose of filtering the water supplied through the mains, thus separating out particles of dirt.

In the course of time, the filter becomes increasingly obstructed and the resulting increase in flow resistance produces a pressure drop in the domestic water line. For this reason, the flow of water is periodically passed through the filter in the opposite direction by means of a change-over mechanism. As a result of this, the outside of the filter becomes, as it were, the inside of the filter, and this reverse flushing procedure releases the build up of dirt and the like from the filter. The water containing this dirt is discharged through the closable outlet aperture which is previously opened for the purpose. After the filter has been cleaned, the outlet aperture is closed again and the water again flows through the filter in the usual direction. The said reverse flushing filter device may also be used for other purpose, for example in hydraulic circuits.

When these known filter devices are used, no water or liquid can be supplied to the consumer unit while the reverse flushing procedure is in operation, the reason for this being that when the change over is made to reverse flushing, the outlet from the filter device is simultaneously shut off. In many cases, however, it is undesirable to shut off the supply of water or the like.

Another known reverse flushing filter device does allow the supply of filtered water to be maintained during the reverse flushing procedure, but this is achieved only with considerable complexity. In this case the device uses two screens through which the water normally flows simultaneously. As a result of the symmetrical arrangement of these two screens, they become contaminated simultaneously and substantially to the same extent. During reverse flushing one of the screens is cleaned first and, as soon as this one is clean, the other one is cleaned. In the event of heavy contamination of both screens, reverse flushing may no longer be possible, in which case the device must be dismantled. In this device, each filter screen requires an outlet valve, a shut off valve and a supply valve, the latter being located in front of each filter screen. This configuration requires a considerable structural length which not only increases production costs, but is also a disadvantage from the point of view of installation.

SUMMARY OF THE INVENTION

It is, therefore, the purpose of the invention to design a reverse flushing filter device, which will make filtered water available during the reverse flushing procedure, in such a manner that the reverse flushing device cannot automatically become clogged, and the reverse flushing mechanism is simple, rugged and compact.

It is proposed to achieve this purpose by means of a reverse flushing filter device described hereunder. For the sake of simplicity, only "water" will be mentioned hereinafter, although, as already indicated, this filter device may also be used to filter other media, for example oil and the like.

When the device is in normal operation, no water flows through the closable reverse flushing filter located upstream of the main filter. Instead, the water bypasses this filter, finally reaching the outlet through the main filter. Now if the reverse flushing filter shut off mechanism is opened, the water can also flow therethrough, since it will now reach the reverse flushing filter before it reaches the main filter. If, at the same time, access to the side of the filter which in normal operation serves as the supply side is shut off, and if the side of the filter acting as the outlet side during reverse flushing is hydraulically connected to the side of the main filter constituting the outlet side in normal operation, then the water flowing through the reverse flushing filter must inevitably flow through the main filter in the opposite direction. If, at the same time, the flow between the side of the filter constituting the outlet side during reverse flushing and the outlet from the filter device is shut off, then the contaminated water can emerge only through the discharge shut off element. The shut off element for the reverse flushing filter is designed and arranged in such a manner that a part of the water su-ply may be used for reverse flushing, while the remainder of the water bypasses the main filter and flows directly to the outlet from the filter device. This is a highly advantageous way of ensuring that, even during reverse flushing, only filtered water emerges from the filter device. As for the two flows of water mentioned above, the amount of each depends upon the pressure relationship. This arrangement not only ensures an uninterrupted flow of water through the filter device even during reverse flushing, but also a constant supply of filtered water. The use of a main filter, and of a reverse flushing filter through which no water flows during normal operation of the filter device, prevents the reverse flushing device from becoming blocked in the event of heavy contamination. During normal operation, almost no dirt is deposited upon the reverse flushing filter, since the incoming water does not flow through it. Instead, the said water merely flows past the outside of the said reverse flushing filter, and this flow keeps this side of the said filter constantly clean. Moreover, the device according to the invention does not require as many shut off elements as the last of the known filter devices mentioned above. Finally, but not least, the arrangement according to the invention provides a particularly simple and compact design.

According to one specially preferred example of embodiment of the invention, both the reverse flushing filter and the main filter are of tubular configuration, and the water flows therethrough only at right angles to their longitudinal axes. Since the reverse flushing filter shut off device is located in the interior thereof, the design is not only extremely compact but is also technically simple.

According to another development of the invention, it is proposed that the reverse flushing filter shut off device shall have a tubular shut off housing arranged concentrically with the reverse flushing filter and having at least one passage passing through the wall of the tube, the said passage being adapted to be closed off by means of a slide valve located in the interior of the tube. It is desirable, however, to provide not only one but a plurality of passages distributed uniformly around a plurality of circles.

The said slide valve is preferably tubular and has the same number of preferably radial passages, arranged in the same way, as the housing of the reverse flushing shut off device. In this connection, the arrangement and dimensions of the said passages or bores must be such that the webs of the slide valve between the said passages can cover the relevant passages in the shut off housing when the filter device is in normal operation, whereas during reverse flushing, the passages or bores in the shut off housing and the slide valves are in alignment. All of the bores are preferably of the same size. The gap between the slide valve and the housing enclosing it should provide the usual amount of play found in shut off slide valves. Any leakage may be prevented in the usual manner, with seals for example, but these must not interfere with the movement of the valve, the latter being preferably axially displaceable and secured against rotation. The use of a sliding valve instead of a rotating valve has certain technical advantages which will be dealt with hereinafter.

According to still another configuration of the invention, the slide valve is connected to, or made integral with, a shut off element which, in conjunction with a valve seat in the housing of the filter device, forms a shut off element for the incoming medium, the said shut off element being used to shut off the supply of medium to the side of the filter constituting the inlet side of the main filter under normal operating conditions. This shut off element has already been mentioned above and is open during normal operation. It is closed only during reverse flushing, in order to prevent contaminated water from entering the outlet from the filter device. Located in front of the discharge shut off element for the contaminated reverse flushing water is a throttling element, preferably a throttle disc valve, forming an annular throttling gap with the inner wall, or an inner shoulder, of the housing of the filter device. This throttling gap prevents a large flow of contaminated water through the discharge shut off element. According to a further development of the invention, the throttle disc valve is connected to the slide valve of the reverse flushing filter shut off device by means of a supporting member passing through the main filter longitudinally. The said throttle disc valve may also be moulded to the said supporting member, in which case they are positively connected. Since the shut off element for the valve which is closed during reverse flushing is also secured or moulded to the slide valve, the said parts together make up a single moving system. This makes it possible for the said throttle disc valve to perform an additional function which will be explained hereinafter. Since the volume of contaminated water flowing out depends upon the setting of the throttle disc valve, there is a drop in pressure downstream thereof. As a result of this, a displacing force acts upon the displaceable unit during reverse flushing, and this causes the shut off element of the shut off valve, closed during reverse flushing, to move to the closed position. Thus all that is required to close the normally open valve and to open the shut off element for the reverse flushing filter is to open the discharge shut off element.

According to still another configuration of the invention, the supporting member is tubular, the wall of the said tube having at least one passage, but preferably a plurality of rows of passages arranged one above the other. It is therefore desirable, mainly for production reasons, for the supporting member and the slide valve of the reverse flushing filter shut off device to consist of a common tube which is closed off, at the end facing the discharge shut off element, by the throttle disc valve. In order to eliminate manual return of the unit automatically displaced when the discharge shut off element is opened, and to provide an automatic return instead, it is proposed, according to another configuration of the invention, that the said common tube be adpated to be closed off, against the force of a return spring, in the direction of closing of the valve shut off element for the incoming medium. During reverse flushing, this spring is loaded or additionally loaded. However, as soon as the discharge shut off element is closed again, full pressure can build up again between the throttle disc valve and the discharge aperture. This enables the return spring to return the system displaced during reverse flushing to its starting position. The return spring may very advantageously be in the form of a compression spring, preferably a helical compression spring, inserted between the throttle disc valve and a step or the bottom of the housing of the filter device. In order to prevent the contaminated water from flowing freely away, the end of the helical compression spring remote from the throttle disc valve preferably rests upon ribs, projections or the like in the interior of the housing of the filter device. This provides outlet passages of sufficient width under the end of the said spring.

According to one specially preferred example of embodiment of the invention, the shut off element connected to the reverse flushing filter shut off element is provided, at the end associated with the relevant valve seat, with a throttle cone or the like co-operating with a throttle passage, throttle edge, or the like in the housing; moreover, the disc associated with the discharge shut off element is in the form of a piston displaceable with little play in a cylinder, the said piston entering an expanded cylinder bore as the throttling effect of the said shut off element increases, and emerging completely from the smaller bore of the cylinder when the shut off element is closed. To be more precise, when the upstream valve is in the closed position, the piston has emerged so far from the smaller cylinder chamber that the throttling action is completely or largely eliminated. In this variant there are really two consecutive throttling locations, the first of which becomes constantly smaller during the reverse flushing, while the latter expands progressively until its throttling action disappears. This design also provides automatic control of the system during the opening and closing of the discharge shut off element.

DESCRIPTION OF THE DRAWINGS

Various examples of embodiment of the invention are illustrated in the drawings attached hereto, wherein.

DESCRIPTION OF PREFERRED EMBODIMENTS

Figure 1:
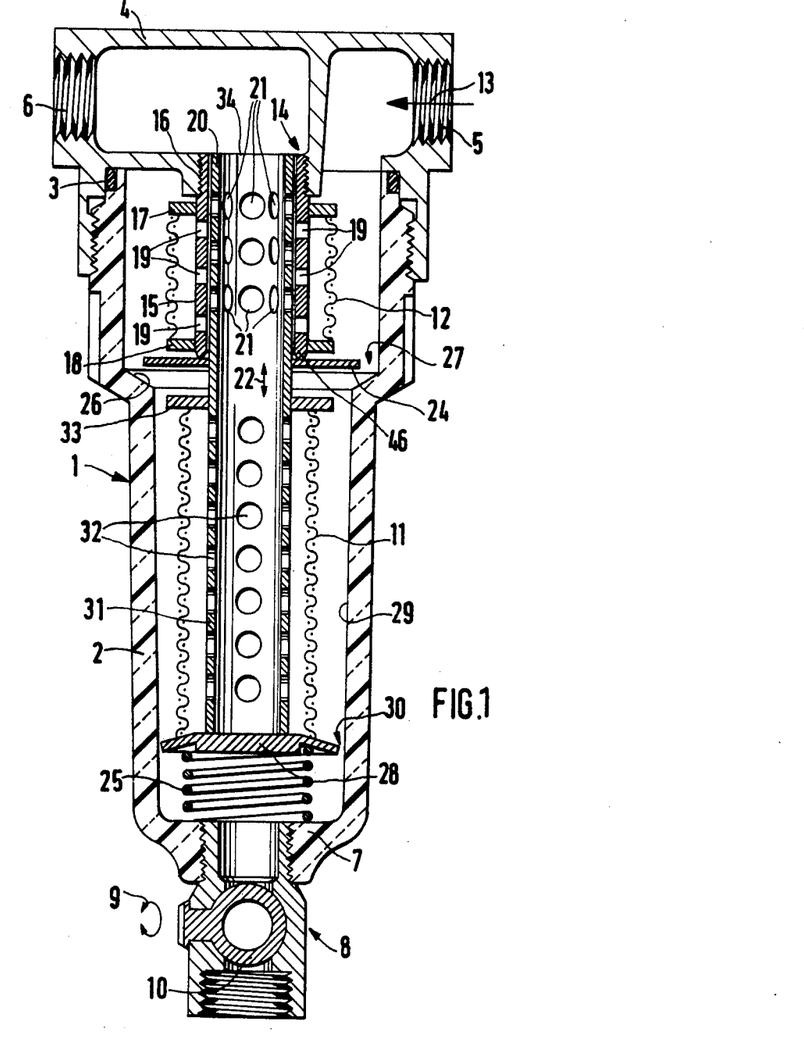
FIG. 1 is a vertical section through the longitudinal centre line of a first example of embodiment in normal operation.
Figure 2:
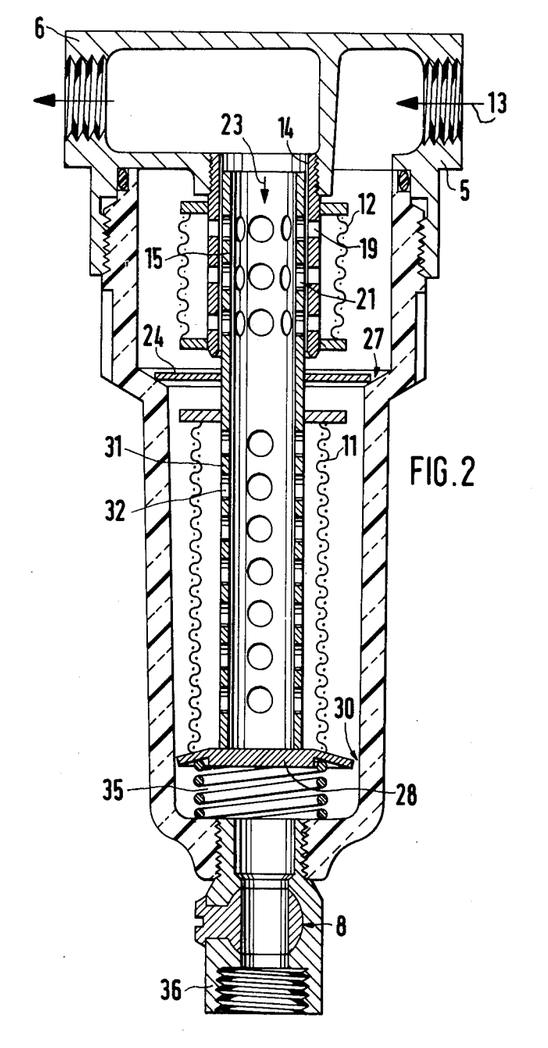
FIG. 2 shows the same filter device during reverse flushing.

Housing 1 of the reverse flushing filter device according to the invention consists of a substantially pot-shaped lower part 2 and of an upper part 4 secured thereto with an interposed sealing ring 3. Lower part 2 of the housing is preferably made of transparent or translucent synthetic material. The upper part of the housing contains an inlet 5 and an outlet 6 in the form of moulded-on pieces of tube, the incoming line being screwed to the one and the ongoing line to the other. The connection may, of course, also be made by means of flanges or other known connecting means. Screwed into a thread in base 7 of lower part 2 of the housing is a discharge shut off element 8 in the form of a plug 10 adapted t be rotated in the direction of double arrow 9. The open position of the discharge shut off element for the contaminated medium, more particularly water, emerging during reverse flushing is shown in FIG. 1, while FIG. 2 shows the closed position. Both the main filter 11 and the reverse flushing filter 12 are of a circular tubular configuration. The medium can pass through both of these filters only radially. The said filters are of known design, consisting of wire gauze, for example. At least parts of the cylinder ends are closed off by discs or annular discs, the significance of which will be explained hereinafter.

The medium, hereinafter referred to only as water, enters housing 1 of the filter device in the direction of arrow 13. Since the reverse flushing filter contains a shut off device 14, which is closed when the filter device according to the invention is in normal operation, the water can flow only through main filter 11 to outlet 6. Shut off device 14 has a tubular housing 15 arranged concentrically with the reverse flushing filter, which can be screwed into the upper part of the housing by means of a thread 16, for example. Located externally of housing 15, and in spaced relationship to each other, are two annular discs 17, 18, between which reverse flushing filter 12 is inserted and sealed. Housing 15 has three rows of holes preferably spaced equally apart and distributed uniformly around the periphery of the said housing, the said holes forming passages 19, passing through the wall of the tube, for the water flowing through reverse flushing filter 12.

Located within shut off housing 15 is a tubular slide valve 20 also equipped with three rows of passages 21 or radial bores, the dimensions and arrangement thereof being comparable to those in shut off housing 15. Slide valve 20 is adapted to move up and down in the direction of double arrow 22, but it cannot rotate in housing 15. In the position shown in FIG. 1, the parts of the wall between passages 21 cover passages 19 in housing 15. For the sake of clarity, the play between shut off housing 15 and slide valve 20 is exaggerated. With the slide valve in the position shown in FIG. 1, therefore, no water can flow through passages 21. This becomes possible only if slide valve 20 is moved downwardly in the direction of arrow 23 (FIG. 2) for the purpose of aligning passages 19, 21 which, as shown in this figure, need not necessarily be of exactly the same size.

Slide valve 20 of shut off device 14 is connected to a shut off element 24 which, in the example of embodiment illustrated in FIG. 1, is in the form of a disc. The said valve and disc may also be moulded together. The force of return spring 25, the purpose of which will be explained hereinafter, causes the upper surface of shut off element 24 to bear against free end 46 of shut off housing 15 when the filter device is in its normal operating position. Shut off element 24 co-operates with a valve seat 26 which may be formed by an internal shoulder or a stepped constriction in housing 1. Valve seat 26 and shut off element 24 together form a shut off valve 27. Since this valve is normally held open by spring 25, it permits a constant flow of incoming water to the inlet or outside of main filter 11, except during reverse flushing.

Located in front of discharge shut off element 8 is a throttle element which, in the example of embodiment illustrated in FIG. 1, is in the form of a throttle disc valve 28, the outer contour of which forms, with inner wall 29 of the housing, an annular throttle gap 30. Throttle disc valve 28 is connected to slide valve 20 of shut off device 14 by means of a supporting member 31 passing centrally through main filter 11 in the longitudinal direction thereof. This supporting member is also in the form of a tube having a series of radial passages 32 arranged uniformly around circles spaced equidistantly apart. The diameter of this supporting member and that of the slide valve are preferably the same, so that both may be produced from a single length of tube. Secured sealingly to the lower end of the supporting member 31 is the said throttle disc valve 28. Main filter 11 is also sealed between throttle disc valve 28 and an annular disc 23 fitted to the upper end of the said supporting member.

The reverse flushing filter device described above operates as follows: with the displaceable system, displaceable in the direction of arrow 22, and to which, as already indicated, main filter 11 also pertains, in its starting position (FIG. 1), water entering in the direction of arrow 13 flows through shut off valve 27, main filter 11, passages 32 in supporting member 31, and mouth 34 of slide valve 20, to outlet 6. Any dirt or the like in the water is deposited upon the inlet or outside of main filter 11. No water flows through reverse flushing filter 12, since it is separated from outlet 6 by shut off device 14.

If discharge shut off element, or discharge plug 8 (FIG. 2) is now opened, a negative pressure is produced in housing chamber 35 below throttle disc valve 28 as a result of the effect of throttle gap 30. This reduces the forces acting in the direction opposite to that of arrow 23, and the displaceable system therefore moves in the direction of arrow 23. Shut off valve 27 is now closed, but shut off valve 14 inside reverse flushing filter 12 is simultaneously opened, and the incoming water can now no longer flow directly to main filter 11. It must flow instead through reverse flushing filter 12 and through the interior of shut off housing 15 and supporting member 31. From here it can flow radially outwardly, in a direction opposite to that in which it was previously flowing, through passages 32 to the inside of main filter 11 which constitutes the outlet side in normal operation. When the water flows radially from the inside to the outside, any particles deposited upon the outside of the filter are washed away. Since shut off valve 27 is closed, the contaminated water can flow only through throttle gap 30 to discharge shut off element 8, leaving the filter device through union 36 to which a line may be connected, if necessary. Dirt removal is improved by the conical configuration of the edge of throttle disc valve 28.

Since shut off device 14 is open during reverse flushing, the water flowing through reverse flushing filter 12, and therefore also filtered, can pass at least in part directly through discharge 6 to a consumer unit or units. In contrast to existing filter devices of this kind, the device according to the invention allows the consumer unit or units to be connected constantly to the water supply line, not shown.

As soon as discharge shut off element 8 is closed again, the pressure in housing chamber 35 increases, whereupon the displaceable system returns to the starting position shown in FIG. 1.

Thus in the design described above, the change-over is produced by flow resistance in the path of the water needed for reverse flushing. As shown in FIGS. 1 and 2 this flow resistance may be produced by an annular throttling location 30 or, if throttle disc valve 28 bears to a greater or lesser extent against the inner wall of housing 1, by means of one or more choke passages passing through the outer wall of disc valve 28. The cross section of the said throttling location must match the gap in shut off valve 27.

Figure 3:
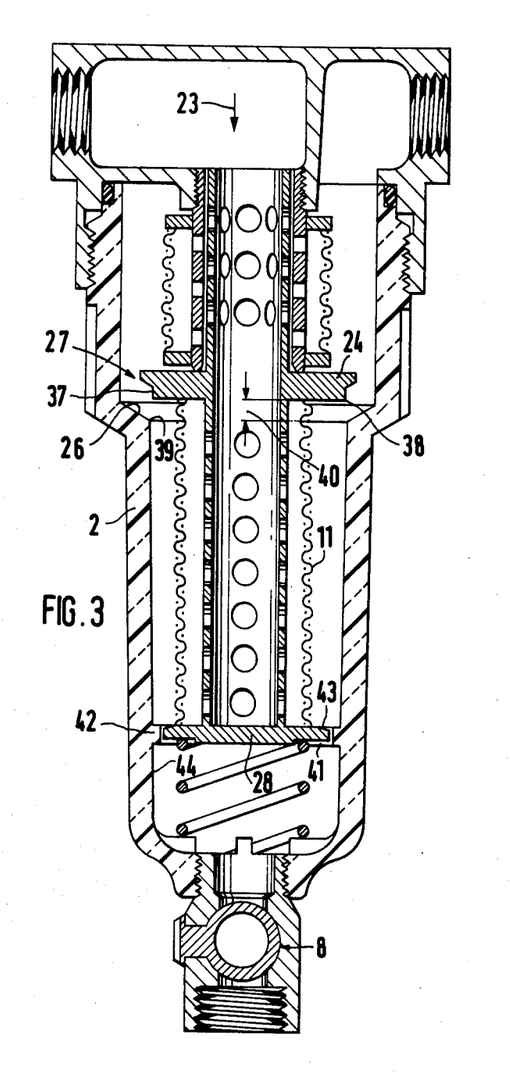
FIG. 3 is a vertical section through the longitudinal centre line of a second example of embodiment in normal operation.
Figure 4:
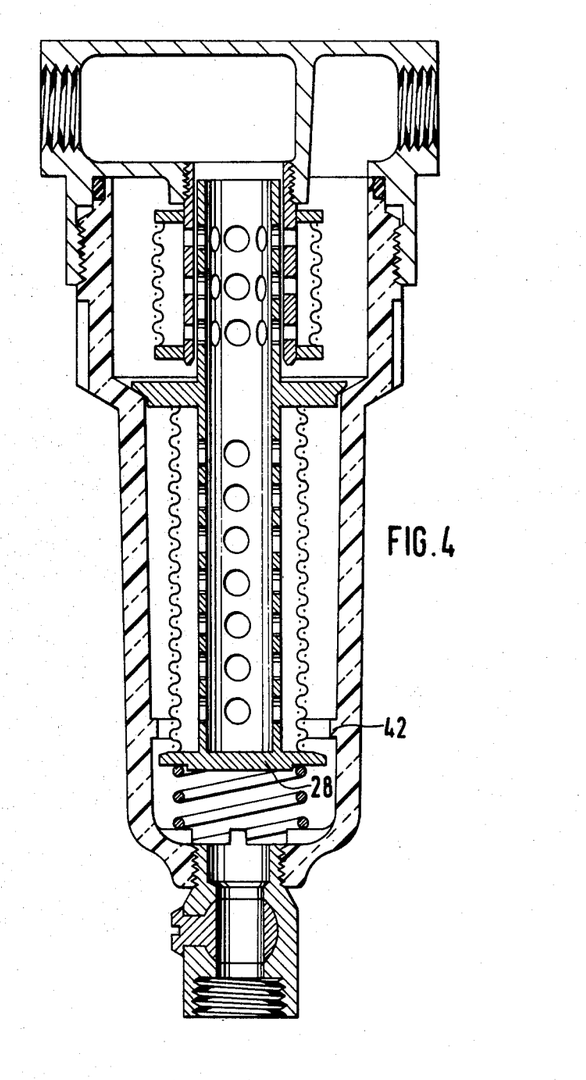
FIG. 4 shows the same variant in the reverse flushing position.
Figure 5:
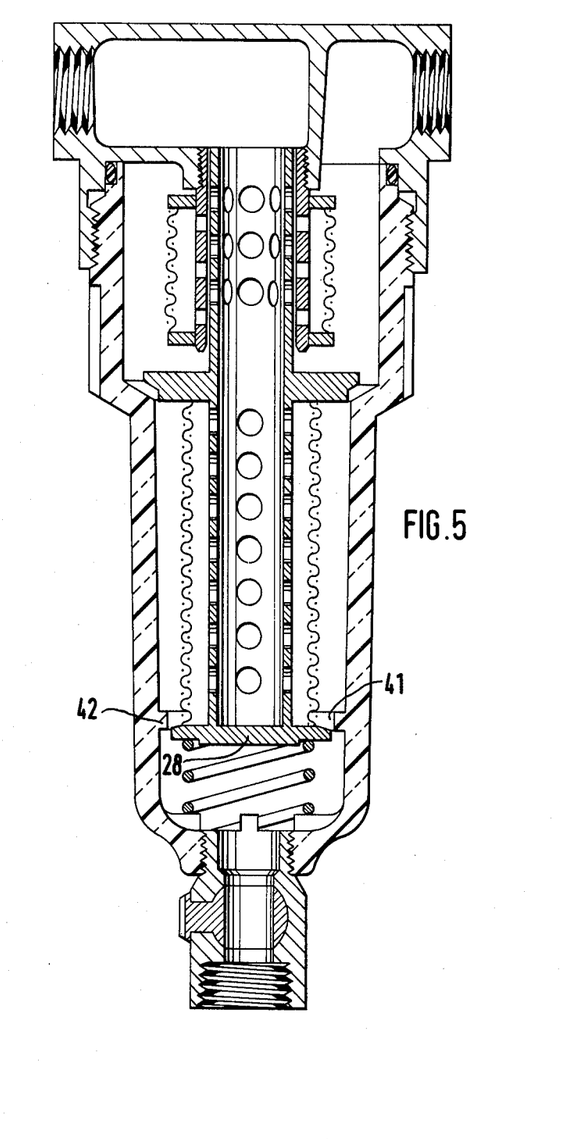
FIG. 5 shows an intermediate position.

The second variant, shown in FIGS. 3 to 5, is substantially the same as the first variant described above. For this reason, only the differences will be described. Similar parts in the two variants bear the same reference numerals.

The end of shut off element 24 of shut off valve 27, pointing towards discharge shut off element 28, carries a throttle cone 37 fitted or moulted thereto. In the normal operating position, sealing edge 38 of throttling cone 37, which terminates in the form of a cylinder, is at a distance 40 from inner edge 39 of valve seat 26.

In the second example of embodiment, throttle disc valve 28 is in the form of a piston adapted to move in a cylindrical bore 41. This bore 41 may, for example, be the cylindrical inner wall of a cross sectionally rectangular inner bead 42 in housing 1 or lower part 2 of the housing. When main filter 11, and the whole mobile system, is moved downwardly in the direction of arrow 23 by the opening of discharge shut off element 8, then upper edge 43 of piston like disc 28 moves through cylindrical bore 41 and, simultaneously, throttling cone 37 enters the constricted portion of housing 1 located, in the direction of flow, after inner edge 39. This produces a throttling location and a pressure drop in the vicinity of valve seat 26. The said pressure drop causes main filter 11, and the mobile system, to move farther down in the direction of arrow 23, until shut off element 24 finally rests upon valve seat 26. At this time disc 28 emerges from constricted cylindrical bore 41 and enters expanded bore 42.

The method of operation of this second example of embodiment is substantially the same as that of the first variant. The only difference is that the throttle station, during reverse flushing, is in the vicinity of shut off valve 27. A certain amount of throttling, but of secondary importance only, takes place at disc 28, especially just as it is leaving constricted cylindrical bore 41 (FIG. 5). However, in the terminal position shown in FIG. 4, disc 28 is so far from bead 42 that there is no throttling of the flow at this location.

Figure 6:
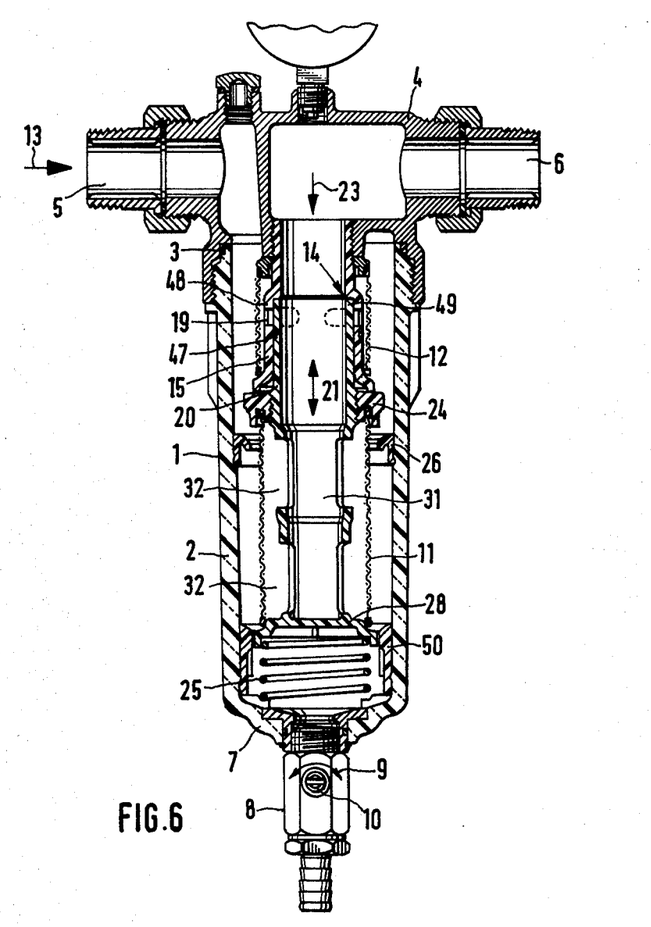
FIGS. 6 and 7 are vertical sections through two other examples of embodiment.
Figure 7:
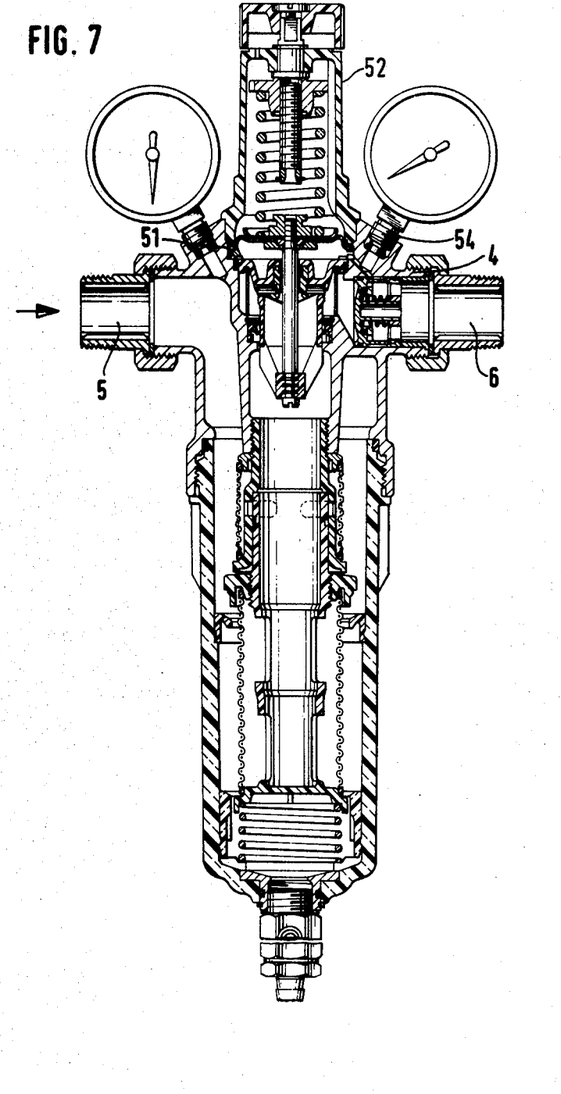

In the examples of embodiment illustrated in FIGS. 6 and 7, use is made of the same basic concept, but several details have been modified. Shut off housing 15 for shut off device 14 has only a single row of passages 19. Slide valve 20, which moves up and down in the interior of tubular shut off housing 15, in the direction of arrow 21, has no passages. Instead, it is moved, during reverse flushing, so far down in the direction of arrow 23 that its upper edge exposes at least partly, but preferably fully, passages 19. The seal between slide valve 20 and shut off housing 15 is in the form of a sealing ring 47 fitted in an external groove in the said slide valve, preferably an O-ring. Furthermore, upwardly pointing free end 48 of slide valve 20 bears against an inner step 49 on shut off housing 15. This inner step is both a sealing surface and a stop for the displaceable mechanism acted upon by spring 25. Sealing ring 47 bears against the inner wall of shut off housing 15. Moreover, free end 48 which, in the operative configuration of the device illustrated, lies above passages 19, is outwardly conical, in order to ensure a smoother opening of shut off device 14.

In the examples of embodiment illustrated in FIGS. 6 and 7, valve seat 26, which co-operates with shut off element 24, is separate and is sealed in the lower housing part 2, thus making it possible for the lower part of the housing to be of constant inside diameter. Throttle disc valve 28 does not co-operate directly with the inner wall of the housing, but with a ring 50 which is produced separately, is also sealed in, and is of a configuration which is hydraulically satisfactory.

Supporting member 31 is also of simpler design and has particularly large passages 32. It is produced in one place with throttle disc valve 28 and slide valve 20.

According to still another configuration of the invention, discharge shut off element 8 is in the form of a magnetic valve. This allows the reverse flushing procedure to be remote controlled and which makes the device independent of human error. In view of the fact that manually operated reverse flushing filter devices are rarely actuated, and that the resulting filter cake may infect the water, automatic reverse flushing acquires considerable significance.

In the example of embodiment illustrated in FIG. 7, use is made of the reverse flushing device according to FIG. 6, except that the upper part 4 of the housing is different. A pressure reducing valve 52 is fitted into an aperture 51 in the said modified upper part of the housing. Also moulded onto the upper part of the housing are connectors 53, 54 for measuring instruments, especially manometers and mano-thermometers, on both the inlet and outlet sides of the said housing, thus making it possible to determine pressure and/or temperatures at these locations. An integrad or separate high speed venting means may also be inserted into upper part 4 of the housing. The entire unit illustrated in FIG. 7 is frequently known as a so called "domestic water station". This shows that the reverse flushing filter device according to the invention may be used not only alone per se, but also in conjunction with other hydraulic mechanisms and devices, especially in so called integrated or compact designs.

In the examples of embodiment illustrated in FIGS. 6 and 7, the displaceable element moving up and down in the direction of double arrow 21 need not be secured against rotation. Neither is this absolutely necessary in the examples of embodiment illustrated in FIGS. 1 to 5. However, the dimensions of passages 19 and 21 must be such as to ensure that at least a portion of each passage 21 is in hydraulic communication with its associated passage 19 in any position of rotation of slide valve 20 in relation to shut off housing 15.

I claim:

1. A reverse flushing filter device having a housing, an inlet and outlet to said housing, a first filter in said housing receiving the flow between said inlet and said outlet, movable means in said housing for diverting the flow through said first filter, a second filter upstream of said first filter in said housing, an apertured housing inside said second filter, a movable apertured tubular slide operable on said apertured housing to provide a closure to the interior of said second filter and during flow through said first filter, said tubular slide extending into said first filter, a discharge aperture to said housing, a movable shutoff element to said discharge aperture, said movable means and tubular slide being responsive to opening of said shutoff element whereby said movable means diverts flow through said first filter and said tubular slide aligns with said inside housing to permit flow through said second filter and into the tubular slide extension to reverse flush the particles on said first filter into said discharge aperture.

2. A device according to claim 1 wherein the flow through said first and second filter is normal to the longitudinal axis of said tubular slide.

3. A device according to claim 1 wherein said tubular slide is axially displaceable and is secured against rotation.

4. A device according to claim 1 wherein said tubular slide is connected to said movable means.

5. A device according to claim 4 having a valve seat to said housing, said movable means being a disc engageable therewith.

6. A device according to claim 1 wherein throttle means is located between said first filter and said discharge shutoff element.

7. A device according to claim 6 wherein said throttle means comprises a second disc which forms a throttle gap with the inner wall of said housing.

8. A device according to claim 7 wherein said second disc is secured to said tubular slide extension of said first filter.

9. A device according to claim 6 wherein said throttle means is biased by a spring bearing against said housing.

10. A device according to claim 1 wherein said shut off element has a throttle cone co-operating with said housing.

11. A device according to claim 5 wherein said disc is in the form of a piston co-operating with a cylinder.

12. A device according to claim 1 wherein said shutoff element is a magnetic valve.

13. A device according to claim 12 wherein said magnetic valve is controlled by an electric clock.

* * * * *